United States Patent

Gillum et al.

[15] 3,665,433

[45] May 23, 1972

[54] LINEAR POSITIONER FOR MAGNETIC TRANSDUCER

[72] Inventors: Daniel L. Gillum, Santa Barbara; Donald E. Gillum, Goleta, both of Calif.

[73] Assignee: Information Magnetics Corporation, Goleta, Calif.

[22] Filed: Oct. 9, 1970

[21] Appl. No.: 79,481

[52] U.S. Cl. .................340/174.1 F, 179/100.2 CA, 308/3.8
[51] Int. Cl. ....................................G11b 21/02, F16c 21/00
[58] Field of Search.............................340/174.1 C, 174.1 F; 179/100.2 CA; 308/6 R, 3.8

[56] References Cited

UNITED STATES PATENTS

| | | | |
|---|---|---|---|
| 3,427,080 | 2/1969 | Folk | 308/6 R |
| 3,464,467 | 9/1969 | Meis | 308/6 R |
| 3,544,980 | 12/1970 | Applequist et al. | 179/100.2 CA |
| 3,314,057 | 4/1967 | Mogtader | 340/174.1 C |

*Primary Examiner*—Vincent P. Canney
*Attorney*—Harry W. Brelsford

[57] ABSTRACT

A carriage for moving read-write transducers for moving data media (discs, drums, tape, etc.) is designed for minimum friction of movement by having wheels with rims of circular cross-section that engage rails or grooves of circular cross-section, but with a different radius. Minimum mass is achieved by having the carriage body webbed and the spaces between the webs filled with an adherent lightweight material such as plastic foam. One of the carriage wheels is adjustable.

10 Claims, 12 Drawing Figures

INVENTOR
DANIEL L. GILLUM
DONALD E. GILLUM
BY H. W. Brelsford
ATTORNEY

MODIFICATION

MODIFICATION

INVENTOR
DANIEL L. GILLUM
DONALD E. GILLUM
BY H. W. Brelsford
ATTORNEY

INVENTORS
DANIEL L. GILLUM
BY DONALD E. GILLUM
H. W. Brekford
ATTORNEY

LINEAR POSITIONER FOR MAGNETIC TRANSDUCER

Our invention relates to the positioning of read-write transducers over the surface of data discs and has particular reference to a low inertia, low friction carriage for supporting such transducers and guidance means for the carriage so that it has rectilinear motion of great accuracy.

A common form of data storage utilizes the imprinting of magnetic surfaces on discs, drums, tapes and other movable media. These media are imprinted by electro-magnetic transducers frequently referred to as read-write heads. An electric signal in the head is converted to a magnetizing force that magnetizes a minute part of the magnetic surface. Such an imprint is usually referred to as a bit. These bits are imprinted along a path of travel of the head relative to the medium and these paths are referred to as tracks. Many tracks are imprinted on the usual magnetic surfaces and in the case of standard rotating discs, there are 200 concentric tracks on one disc. The heads, accordingly, must be moved accurately to any one of these 200 tracks for imprinting the discs. Since the same heads are used for reading the magnetic bits, during reading cycles the heads must also be moved with great accuracy to any selected one of these 200 tracks.

Such data storage and retrieval is widely used on computers, and these instruments can process data so rapidly that fast movement of the read-write heads is desirable. In addition, the computers are so expensive that a premium is placed on rapid head movement so that the computer will be idle as short a time as possible while the heads are moving from one track to another. The specifications of computer manufacturers require a time of movement from one track to another of several milliseconds. Such time rates of speed are so high that they can approach 500 cycles per minute. This rate of movement imposes engineering design requirements, in addition to a powerful motor,of minimum mass for the carriage, and minimum friction of movement. The accuracy requirements dictate maximum rigidity for the carriage.

We have met these engineering design requirements by providing a deck and web design for the carriage with the openings in the web filled with an adherent lightweight material such as plastic foam to increase rigidity and reduce vibration. We have met the low friction requirement by providing for rolling contact not only to support the carriage, but to guide it as well.

It is therefore a general object of our invention to provide an improved linear positioner for transducers for data storage and retrieval.

Other objects, advantages and features of the invention will be apparent in the following description and claims, considered together with the accompanying drawings forming an integral part of this specification, in which;

Figures 1, 2:
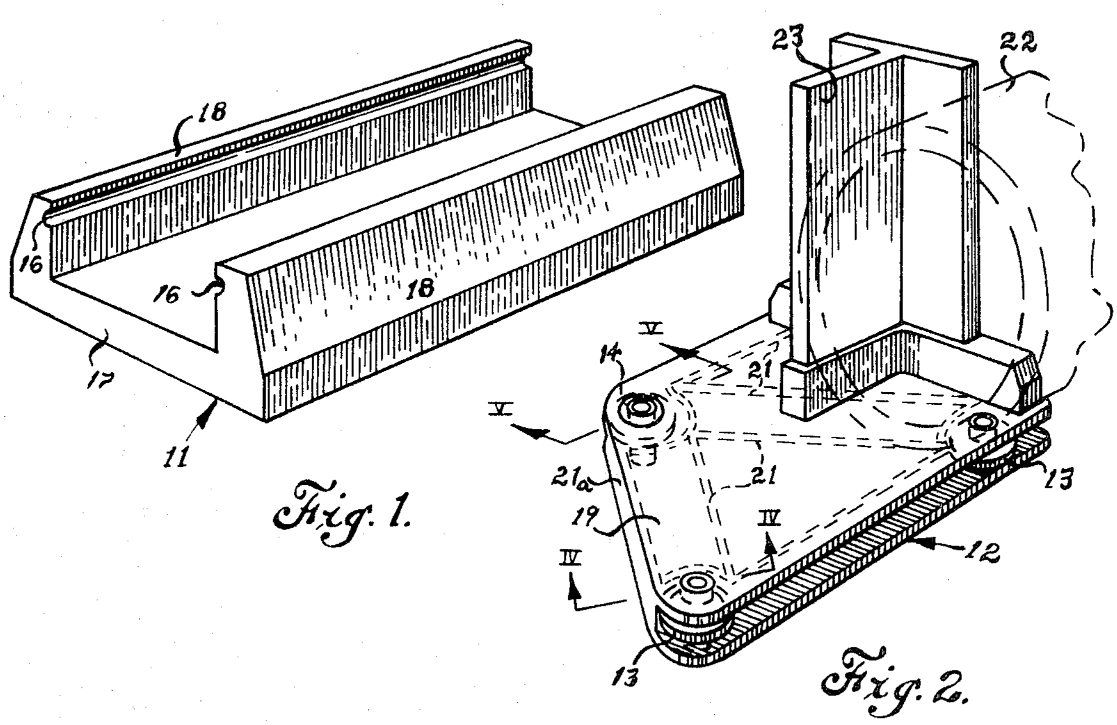
FIG. 1 is a three-dimensional view of a guide for the carriage.
FIG. 2 is a three-dimensional view of a carriage forming the other part of the linear positioner and illustrating the tower or post upon which the transducer heads are mounted, and showing in broken outline an armature of a motor rigidly mounted to the carriage.
Figure 3:
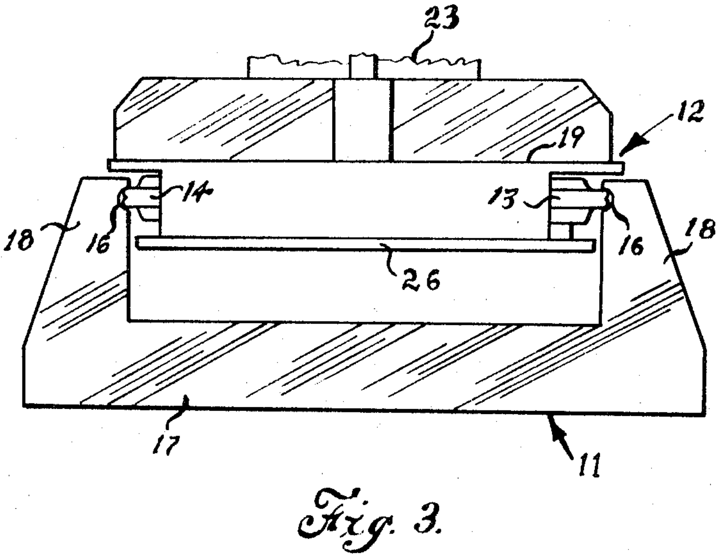
FIG. 3 is a front view of the assembly of the guide of FIG. 1 and the carriage of FIG. 2, wherein the wheels of the carriage ride in grooves in the guide.

Referring to FIGS. 1, 2 and 3, a guide 11 may be of any desired shape, and there is illustrated a channel shape having parallel walls 18 in which are formed parallel grooves 16 having a generally semi-circular cross-section. A base plate 17 joins the two walls 18 together.

A carriage 12 has wheels 13 on one side and a single wheel 14 on the other side, and these wheels 13 and 14 fit into the grooves 16 of the guide 11, as illustrated in FIG. 3. The carriage 12 has a top deck 19 on which is mounted a post or tower 23 which supports a number of transducers or read-write heads (not shown) for writing on moving media in various tracks. The carriage 12 may be moved back and forth by any suitable motive power and a linear motor is a presently preferred prime mover. There is illustrated in broken outline a cylindrical armature 22 for such a linear motor, and this armature may be secured to the post 23 and to the body of the carriage 12.

The body of the carriage is formed particularly in accordance with the invention to achieve minimum amount of mass and weight together with maximum rigidity. Referring especially to FIG. 2, there depends downwardly from the top deck 19 a number of integrally formed ribs 21, and in the left part of FIG. 2, one such rib **21*a* may form the front edge of the carriage 12. As shown best in FIG. 4, the openings between these ribs 21 are filled with an adherent lightweight material 24 and plastic foam formed in place between the ribs and on the underside of the top deck 19 is presently preferred. This material adheres extremely well to the surface with which it comes in contact. There may be used additional ribs over the ribs 21 shown in broken outline in FIG. 2; and, for example, there may be a pair of central ribs extending lengthwise of the carriage 12** which intersect the other ribs and join with them to obtain additional rigidity of the body.

Figure 4:
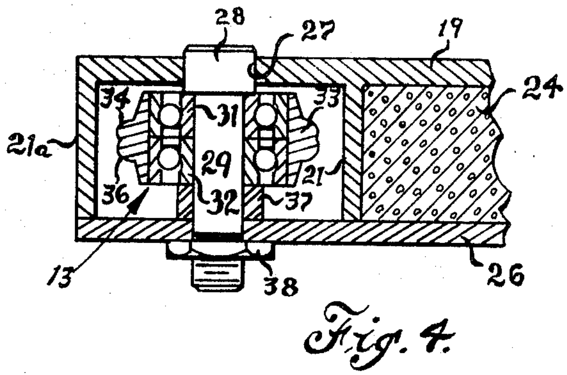
FIG. 4 is a sectional view on an enlarged scale, taken along the line IV—IV of FIG. 2, showing the construction of one of the non-adjustable wheels on the carriage.

The bottom part of the carriage 12 is formed by a bottom plate 26 shown in FIGS. 2, 3 and 4. This plate may be secured to the ribs 21 in any suitable fashion, as by epoxy, spot welding, screws, or other fasteners; but at present epoxy cement has proven to be extremely strong and suitable for the purpose.

Illustrated in FIG. 4 is one of the non-adjustable wheels 13 which are also shown in FIGS. 2 and 3. Formed in the top deck 19 is a hole 27 in which is press fitted the head 28 of a bolt having a shank 29 which passes through a hole in the bottom plate 26. Mounted on the shank 29 are a pair of roller bearings 31 and 32 which are constructed to have opposed thrust capability. The exterior of the two bearings 31 and 32 are joined together by a rim 33 having two projecting contact surfaces 34 and 36 formed particularly in accordance with the invention. A sleeve 37 may be disposed between the bottom bearing 32 and the plate 26, and a nut 38 holds the assembly tightly together.

Figure 9:
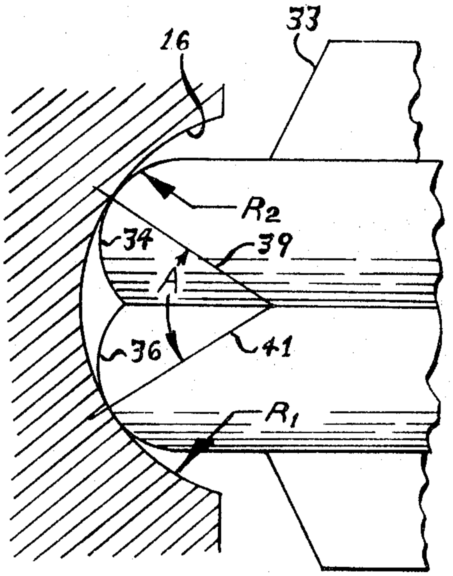
FIG. 9 is an enlarged diagram showing the contact of the wheel periphery with the semi-circular groove of the guide of FIG. 1.

Illustrated in FIG. 9 is the nature of the contact between the wheel rim 33 and the semi-circular groove 16 (FIG. 1). The upper contact surface 34 may be formed on a radius $R_2$ which is less than the radius $R_1$ of the groove 16. The lower contact surface 36 may have the same radius $R_2$ as the upper surface 34. The center of the area of contact of the upper surface 34 with the grooves 16 is shown by the line 39 and the center of the area of contact of the lower surface 36 is shown by the line 41. The angle between these two lines is designated by the letter A and this angle may vary from 45° to about 120° and still achieve effective rigidity of contact of wheel and groove. The ratio of the radii $R_1$ and $R_2$ can also vary over wide limits and those illustrated are about 1 to 2, but the ratio could approach closer to unity with good results. The important thing is that the use of a radius of curvature contacting a larger radius of curvature gives a large bearing area for the surfaces 34 and 36 so that there is no local permanent deformation of either the groove surface or of the contact surfaces 34 and 36. Furthermore, this wide area of contact reduces friction to almost a minimum, and this is particularly evident when contrasted to a rectangular bearing riding in a V-shaped groove, wherein the friction is so great as to substantially reduce the mobility of the carriage and thereby increase the power requirement for its movement.

Figure 5:
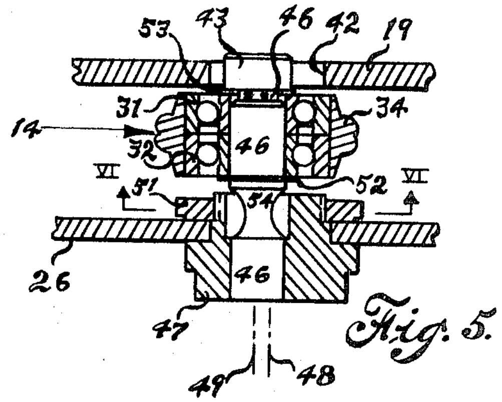
FIG. 5 is a sectional view on an enlarged scale, taken along the line V—V of FIG. 2, showing the construction of an adjustable wheel on the carriage.

Referring to FIG. 5, there is illustrated the adjustable wheel 14 shown in FIGS. 2 and 3 also. Cut into the top deck 19 is a hole 42 which is larger than the head 43 of a bolt having a shank of 44 that is threaded into a post 46 which, in turn, is press fitted into an eccentric bushing 47 having an exterior symetrical about an axis 48. The post 46 has an axis 49 and the distance between the two axes is the amount of adjustment available. The eccentric bushing 47 is locked to the bottom plate 26 by a nut 51. Integrally formed on the post 46 is a flange 52 and a pair of bearings 31 and 32 are pressed against this flange by a washer 53 which, in turn, is compressed against the ball bearings 31 and 32 by the bolt head 43 threaded into the post 46.

Figure 6:
FIG. 6 is a sectional view along the line VI—VI, showing the reduced section on the post on which the wheel is mounted, which allows for a bending action.

Provided particularly in accordance with the invention is a reduced section 54 on the post 46 and this section is shown in more detail in FIG. 6. This reduced section allows the post 46 to bend at the reduced part to accommodate any minor machining irregularities for the groove 16 of FIG. 1, or to accommodate any accidental dust that may be present on the grooves or on the rim 34 of the wheel 14.

It will be noted particularly with reference to FIG. 2 that the wheel 14 on one side of the carriage 12 is disposed between imaginary lines which pass through the wheels 13 and which are perpendicular to or normal to the walls 18 of the guide 11. This results in three points of contact which establishes the plane of the carriage 12 with great accuracy. By properly adjusting the wheel 14 as described with reference to FIG. 5, the pressures of the wheels against the groove 16 can be closely regulated to give maximum rigidity of movement of the carriage, but without deforming the surfaces of either the grooves or the wheels. It will be appreciated by those skilled in the art that any one of the three wheels could be adjustable, but minimum movement of adjustment is obtained by using the single wheel on one side as the adjustable wheel.

Figure 8:
FIG. 8 is a sectional view along the line VIII—VIII of FIG. 7, showing the rectangular cross-section of the reduced part of the post.
Figure 7:
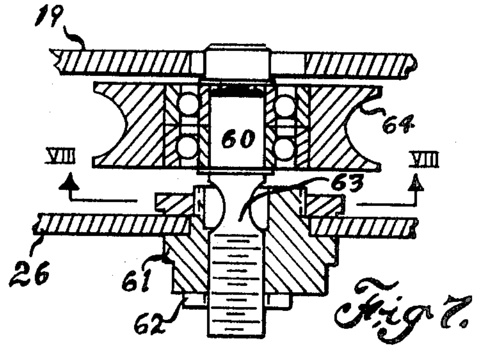
FIG. 7 is a sectional view through a modified form of adjustable wheel which acts similarly to the wheel of FIG. 5, but wherein the post has a reduced cross-section in the form of a rectangle which permits the post to be mechanically bent to achieve adjustment in addition to any eccentric adjustment.

Illustrated in FIG. 7 is a modified form of adjustable wheel wherein the reduced cross-section of the post is a rectangle. A post 60 may be threaded into an eccentric bushing 61 and locked in place by a nut 62. The post 60 may be reduced in cross-section at 63 and this cross-section is shown best in FIG. 8. With this type of post, the adjustment may be obtained not only by rotating the eccentric bushing 16, but by mechanically bending the post 60 until it inelastically deforms to move a rim 64 toward or away from its respective groove or rail. The post 60 may be rotated so that the lengthwise dimension of the rectangle of FIG. 8 may be parallel to the wall on which the rail is located upon which the wheel rides.

Figure 10:
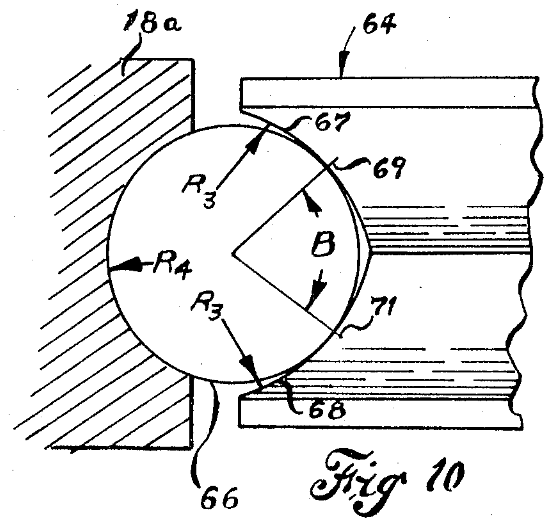
FIG. 10 is an enlarged diagram of a modified form of the invention, wherein the wheel rides on the exterior of a horizontal rod and the wheel surfaces are concave to engage this rod.

Illustrated in FIG. 10 is a modified form of the invention wherein a round rod 66 is suitably secured to a wall 18a and the rim 64 of a wheel rides on the exterior of this round rod 66. In this modification, the ratios between the curvature of the rim of the wheel and the rail (equivalent of the groove) are reversed. The rim 64 has a concave or pulley-like surface formed of two separate surfaces of revolution 67 and 68 having a radius $R_3$, and this compares with a radius $R_4$ for the round rod 66. The center of the area of contact with the surface 67 is designated by the line 69 and the center of the area of contact with the surface 68 is indicated by the line 71 and the angle between them is designated as B. The angle B may vary between 45° and 120° depending upon the load and the relative hardness and elasticity of the two bearing materials. The ratio of radii, that is of $R_3$ to $R_4$, may be the same as with FIG. 9, except that the ratio is reversed and this may vary from 1 to 4 to close to unity. The lower ratios, of course, have a greater surface of contact and therefore can accommodate greater loads or accommodate the same load with softer materials.

It will be appreciated by an inspection of FIGS. 9 and 10 that the double surfaces on the rim of the wheels controls motion in a direction along the axis of the wheels. In the particular embodiment illustrated, this would be motion along a vertical direction, but it will be appreciated that the entire device could be rotated 90° so that such motion would then be horizontal. In any position, and in any event, the tight bearing of the double wheel curvatures against the rail portion of the parallel walls, whether a groove or a projecting surface, prevents any movement. The amount of adjustment of the wheels, as shown in FIGS. 5 and 7, can control the elastic deformation of the two bearing materials and in this way accommodate various loads imposed on the carriage. Hardened medium carbon steel is presently desired for these surfaces. This broad area of contact between the rail portions and the wheels further gives rise to a low friction because there is no wedging action and there is a minimum of elastic deformation.

It will be appreciated that the web-like structure formed by the ribs 21, as shown in FIGS. 2 and 4, give rise to maximum rigidity with minimum weight. Further, the securing of the bottom plate 26 to these ribs by epoxy cement gives a continuous connection of this bottom plate to all of the ribs, giving maximum rigidity in this area of the carriage. The use of an adherent foam 24 (FIG. 4) reduces vibration and increases the rigidity of the structure. This foam is carefully machined off to the surface of the ribs before adhering the plate 26 to the ribs. Furthermore, epoxy is spread over the machined surface of the foam as well, so that there is direct mechanical connection of the bottom plate 26 not only to the ribs 21 but to the foam also, which increases the rigidity of the bottom plate 26. The foam may be formed in place to obtain its adherence to the ribs and the top deck 19.

We have found that for maximum dimensional stability of the wheels against movement along the wheel axes it is necessary to preload the ball bearing pairs shown in FIGS. 4, 5 and 7. Selected pairs of bearings are used so that compression of their inner races together by the bolts employed causes their outer races to preload the balls to not only eliminate axial slop or tolerance, but to actually place an elastic pressure against the races that oppose each other. This eliminates any axial movement of the wheels under thrust loads within design limits. Thus the only possibility of movement deviation from a straight line lies in irregularities of the wheel engaging surfaces or on dust being present on such surfaces.

Various types of spring structures could be substituted for the reduced portion 54 of FIG. 5 and the reduced portion 63 of FIG. 7. The illustrated structures however are eminently simple and reliable and lend themselves to exact position adjustment of the adjustable wheel.

Figures 11, 12:
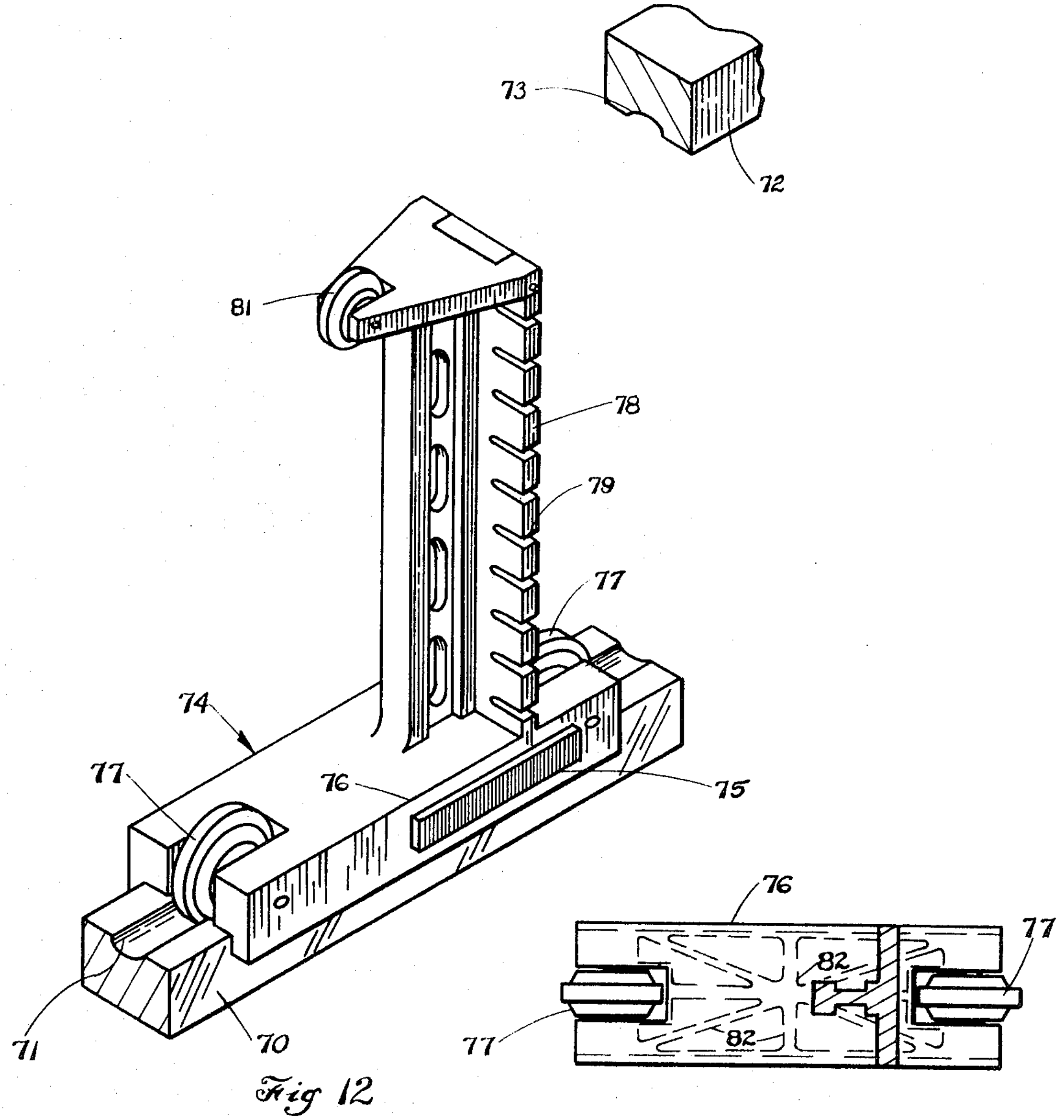
FIG. 11 is a three-dimensional view of a modified form of the invention, wherein one wheel is placed at the top of the transducer post to obtain maximum accuracy of alignment.
FIG. 12 is a plan view of the carriage of FIG. 11 with portions of the post removed.

Referring to FIG. 11, there is illustrated a form of the invention wherein maximum stability is provided for the post that supports the transducer heads by virtue of placing one of the carriage wheels at the top of the post. Disposed at the bottom of that structure is a guide or way 70 having a generally semicircular groove 71 formed therein and disposed at the top of that structure is a second guide or way 72 having a groove 73 formed therein which is parallel to the groove 71. A carriage 74 has a body member 76 which is supported by a pair of wheels 77 disposed front and rear on the body 76. Integrally formed on, or rigidly secured to, the body 76 is a tower or post 78 which has suitable receiving notches or recesses 79 in which are fitted the transducers or read-write heads (not shown). Mounted to the top of the post 78 is a third wheel 81 which rides in the groove 73. The peripheries of wheels 77 and 81 are formed as illustrated in FIG. 9, or alternatively could be formed as in FIG. 10. Also, the wheels 77 and 81 are mounted on opposed bearing pairs as shown in FIGS. 4, 5 and 7.

The top wheel 81 should be preloaded by a suitable mounting structure such as the adjustment mechanisms of FIGS. 5 and 7. The top wheel 81 is also disposed between imaginary lines through the axes of the two bottom wheels 71 and normal to the way 70. The preloading of wheel 81 against its track 73 therefore reacts also on wheels 77 causing them to be pressed tightly in their track 71.

Referring to FIG. 12, the body member 76 may have internal ribs 82 in any desired configuration, and the interior of the body 76 may be filled with foam or other lightweight material that adheres to the ribs. A bottom plate may be fitted over the ribs and the foam in the same fashion as that illustrated in FIGS. 3 and 4. Any one of the wheels 77 or 81 may be made adjustable as in FIG. 5 so as to create the desired bearing pressure on all of the wheels against their respective grooves. Formed on or mounted on one side of the body 76 are teeth 75 of a rack that is part of a position transducer to control movement of the carriage 74 to dispose its heads (not shown) on the selected track of the data media.

The guidance of the tower 78 top and bottom by means of the wheels and grooves gives the maximum accuracy of guidance.

Various materials of construction may be employed for all of the carriages and towers, and aluminum and magnesium are presently preferred materials, although plastic with suitable dimensional stability may be employed.

The use of the word "circular" is to denote curved surfaces, and it is obvious that various curves could be used, such as parabolas, ellipsoidal curves, or various other curves. The important thing is that the use of curves of differing curvature gives rise to a selected amount of bearing area with minimum friction. Accordingly, the use of the word "circular" or "semicircular" denotes curvature and not precise geometrical shapes. The word "way" is used to describe the walls 18 of FIG. 1 and similar guiding structure. The description of the carriage as extending between the guides or ways includes carriages set to one side that have offset wheels as well as wheels engaging opposite sides of the ways.

Various modifications and improvements will occur to those skilled in the art, and all such variations and modifications that come within the true spirit and scope of the invention are included within the scope of the following claims.

We claim:

1. A linear positioner for transducers comprising:

a. a guide having a pair of parallel ways, each having a rail portion of circular segment cross-section, said rail portions being parallel to each other;

b. a carriage disposed between the ways and having sides adjacent to the ways;

c. two spaced wheels on one side of the carriage engaging the rail portions of the adjacent way, and each having an axis of rotation;

d. and at least one wheel on the other side of the carriage disposed between lines passing through the other two wheels normal to the ways, characterized by said wheels having at least one surface of contact with the rail portion that is a circular segment in cross-section of different radius than the rail portion cross-section.

2. A linear positioner as set forth in claim 1 wherein the rail portion is a groove and the wheel surface of contact has a radius less than that of the groove.

3. A linear positioner as set forth in claim 1 wherein the rail portion is a projection and the wheel surface of contact has a cross-section radius greater than the projection cross-section radius.

4. A linear positioner as set forth in claim 1 wherein each wheel has two surfaces of contact with the rail portion to stabilize the carriage against movement along the wheel axes.

5. A linear positioner as set forth in claim 1 wherein at least one wheel is spring loaded to give a tight contact of all three wheels with the rail portions and to accommodate minor irregularities of the rail portions.

6. A linear positioner as set forth in claim 1 wherein at least one wheel is mounted on a post having a reduced portion of rectangular cross-section and the lengthwise dimension of the rectangle is aligned with the parallel ways, said reduced portion acting as a spring to press the wheel against the rail portion.

7. A linear positioner as set forth in claim 1 wherein the carriage has a deck, a bottom plate and substantial body thickness between the deck and plate, and the body is webbed and filled with adherent lightweight material to aid in stiffening the carriage body and reducing vibration, and a bottom plate is mechanically connected to the lightweight material and the ribs.

8. A linear positioner as set forth in claim 1 wherein the carriage extending between the ways is provided with means for receiving the transducers in operative position.

9. A linear positioner for transducers comprising:

a. a pair of spaced parallel ways each having a rail portion of circular segment cross section;

b. a carriage in the form of a transducer post to which transducers are secured in operative position, said carriage being disposed between the ways and having sides adjacent to the ways;

c. a pair of spaced wheels having rotation axes mounted on one side of the carriage for engagement with the rail portion of the adjacent way;

d. and a wheel mounted on the other side of the carriage for engagement of the rail portion of the other way, and disposed between lines passing through the wheel axes of the wheel pair at right angles to the ways, characterized by said wheels having at least one surface of contact with the rail circular segment that is a wheel circular segment in cross section of different radius than the rail segment, whereby said transducer post is accurately guided by rails at each end to obtain great accuracy of transducer positioning.

10. A linear positioner as set forth in claim 9 wherein the spaced ways are in a vertical plane and the post is vertical for supporting transducers that can operate on generally horizontal data media.

* * * * *